United States Patent
Murakami

Patent Number: 5,616,866
Date of Patent: Apr. 1, 1997

[54] METHOD OF FINDING STRESS DISTRIBUTION FROM TEMPERATURE VARIATION PATTERN ON SURFACE OF ELASTIC BODY

[75] Inventor: Yukitaka Murakami, Fukuoka, Japan

[73] Assignee: Jeol Ltd., Tokyo, Japan

[21] Appl. No.: 529,267

[22] Filed: Sep. 19, 1995

[51] Int. Cl.$^6$ .................................................. G01N 19/00
[52] U.S. Cl. ................................................. 73/804; 73/805
[58] Field of Search ........................... 73/804, 806, 785, 73/788, 791; 364/508

[56] References Cited

U.S. PATENT DOCUMENTS

| | | | |
|---|---|---|---|
| 3,589,812 | 6/1971 | Robert | 73/804 |
| 4,107,980 | 8/1978 | Crane et al. | 73/799 |
| 4,561,062 | 12/1985 | Mitchell | 73/786 |
| 4,764,882 | 8/1988 | Braschel et al. | 364/508 |
| 5,400,131 | 3/1995 | Stockley et al. | 356/33 |

Primary Examiner—Richard Chilcot
Assistant Examiner—Max H. Noori
Attorney, Agent, or Firm—Webb Ziesenheim Bruening Logsdon Orkin & Hanson, P.C.

[57] ABSTRACT

Method of finding the distribution of stresses on and in an elastic body from data about the pattern of a temperature variation pattern on the surface of the elastic body caused by the thermoelastic effect and also from data obtained by numerical analysis of the stresses. First, stress variations are adiabatically given to the actual elastic body. The pattern of temperature variations on the surface of the object caused by the thermoelastic effect is detected. Then, the sums of principal stresses inside the surface of the object are found from the temperature variation pattern. A plurality of free nodal points are established at the boundary of a model of a structure having the same shape as the actual object. A unit external force is applied to certain one of the free nodes. The sums of the resulting stresses at the internal points are found by numerical analysis. The distribution of external forces acting on the free nodes which is closest to the actually measured principal stress sum distribution is found by the principle of superposition and by the least squares method. The stress components acting on arbitrary points on or in the actual object are found by numerical analysis from the obtained external force distribution.

8 Claims, 2 Drawing Sheets

METHOD OF FINDING STRESS DISTRIBUTION FROM TEMPERATURE VARIATION PATTERN ON SURFACE OF ELASTIC BODY

FIELD OF THE INVENTION

The present invention relates to a method of finding the stress distribution on and in an elastic body from a temperature variation pattern on the surface of the elastic body and, more particularly, to a method of finding the stress distribution on and in an elastic body from data about a temperature variation pattern on the surface of the elastic body attributed to the thermoelastic effect and also from data obtained by numerical analysis of stresses.

BACKGROUND OF THE INVENTION

A stress at an arbitrary point on or in an elastic body is generally expressed in terms of six components $\sigma_x$, $\sigma_y$, $\sigma_z$, $\tau_{xy}$, $\tau_{yz}$ and $\tau_{zx}$ when the (x, y, z) rectangular Cartesian coordinate system is used. Among them, $\sigma_x$, $\sigma_y$, $\sigma_z$ are normal stress components acting on planes vertical to the x-, y- and z-axes, respectively. $\tau_{xy}$ is a shearing stress acting on a plane with x=constant in the direction of the y-axis and on a plane with y=constant in the direction of the x-axis. Also, $\tau_{yz}$ and $\tau_{zx}$ are shearing stresses. All the subscripts obey the same definition. With respect to this point, if an appropriate system of coordinates is selected, all the shearing stress components are vanished, and only the normal stress components exist. These normal stress components are known as principal stresses $\sigma_1$, $\sigma_2$ and $\sigma_3$, respectively.

If a stress change is adiabatically applied to an elastic body, a temperature change occurs proportionately. This phenomenon is known as the thermoelastic effect and was discovered by Weber, Kelvin, and other in the 19th century. Let $\Delta T$ be the temperature difference produced before and after application of a stress by the thermoplastic effect. We have the relation $$\Delta T = -KT(\sigma_1 + \sigma_2 + \sigma_3)$$

where K is a thermoelastic constant intrinsic to the material and T is absolute temperature. The sum of the principal stresses $(\sigma_1+\sigma_2+\sigma_3)$ is the stress invariant of the first order. The theory of elasticity has demonstrated that this sum of the principal stresses is equal to $(\sigma_x+\sigma_y+\sigma_z)$, irrespective of how the system of coordinates (x, y, z) is determined. The temperature difference $\Delta T$ is in proportion to the sum of the principal stresses because the volume change of the elastic body following Hooke's Law is determined by the stress invariant of the first order and because the volume of the elastic body is varied by none of the shearing stress components $\tau_{xy}$, $\tau_{yz}$ and $\tau_{zx}$.

We have already proposed methods of easily measuring stress distributions by making use of the above-described thermoelastic effect, as described, for example, in Japanese Patent Publication Nos. 1204/1987, 1205/1987 and 7333/1988. In particular, compressive and tensile loads are repeatedly applied to an elastic body by utilizing the thermoelastic effect. The resulting temperature variation pattern on the surface of the elastic body is detected by an infrared camera. Thus, the distribution of the stress invariant of the first order is measured.

On the other hand, known methods for numerically analyzing the stress distribution on and in an elastic body include the finite element method, the boundary element method and the calculus of finite differences. In these methods, a model having the same shape as an actual object is prepared. Elastic constants and applied external forces are given as boundary conditions to the model. The stress distribution in and on the elastic body is found. proportion to the distribution of the stress invariant of the first order, i.e., the sums of the principal stresses $(\sigma_1+\sigma_2+\sigma_3)$ as mentioned previously. However, it is impossible to know the individual stress components $\sigma_x$, $\sigma_y$, $\sigma_z$, $\tau_{xy}$, $\tau_{yz}$ and $\tau_{zx}$ only from the temperature variation pattern. On the other hand, in methods of numerical stress analysis such as the finite element method, it is not easy to set the boundary conditions appropriately. Therefore, it is not assured that the obtained results correspond to the stress distribution on and in the actual object.

SUMMARY OF THE INVENTION

In view of the foregoing problems with the prior art techniques, the present invention has been made.

It is an object of the invention to provide a method of easily finding the stress distribution on and in an elastic body as well as individual stress components by combining the data about a temperature variation pattern on the surface of the elastic body attributed to the thermoelastic effect with the data obtained by numerical stress analysis.

The above object is achieved in accordance with the teachings of the invention by a method of finding the stress distribution on and in an actual elastic body from a temperature variation pattern on a surface of the elastic body, said method comprising the steps: adiabatically applying stress variations to the actual elastic body; detecting a temperature variation pattern created by the thermoelastic effect; finding sums of principal stresses at points located inside the surface of the actual object from the detected temperature variation pattern; preparing a model of a structure having the same shape as said actual object; establishing a plurality of free nodal points at a boundary of said actual object; applying a unit of external force to certain one of said free nodal points and finding the sums of the principal stresses at the points located inside the surface of the actual object by numerical analysis; then finding distribution of the external force applied to said free nodal points which provide a principal stress sum distribution closest to the actually measured distribution of the principal stress sums by the principle of superposition and by the least squares method; and finding stress components acting on arbitrary points on or in the actual object by numerical analysis from the found distribution of the external force.

In the present invention, the distribution of the external force acting on said free nodal points which provide a principal stress sum distribution closest to the actually measured distribution of the principal stress sums is found, the latter distribution being found from data about the temperature variation pattern on the surface of the elastic body attributed to the thermoelastic effect. The stress components at the arbitrary point on or in the actual object are found by numerical analysis. Consequently, the distribution of stress components on and in the actual object can be accurately found by this straightforward method.

It is impossible in principle to separate individual stress components from information only about the sums of principal stresses in some problems (e.g., in the case where a smooth round rod which produces the same sum of principal stresses at the same point in response to application of different external forces such as pure tension and tension superimposed with tension). However, these problems are relatively unimportant in practical situations. Generally, in practically important problems, such drawbacks do not take place. Rather, they can be solved by the invention.

Other objects and features of the invention will appear in the course of the description thereof, which follows.

DETAILED DESCRIPTION OF THE INVENTION

The principle of the present invention is described below. The invention assumes that a temperature variation pattern obtained when a given stress variation is applied to an actual elastic object is detected by a method utilizing the thermoelastic effect as described in the above-cited Japanese Patent Publication Nos. 1204/1987, 1205/1987 and 7333/11988 and that the distribution of the sums of principal stresses $(\sigma_1+\sigma_2+\sigma_3)$ on the surface of the actual elastic object has been found from data regarding the pattern. The sum $(\sigma_1+\sigma_2+\sigma_3)$ of principal stresses is equal to $(\sigma_x+\sigma_y+\sigma_z)$. Furthermore, we assume that the distribution of stresses in and on a model conforming in shape to the actual object is found by numeral analysis such as the finite element method after giving elastic constants and applied external forces to the boundary as boundary conditions.

Figure 1:
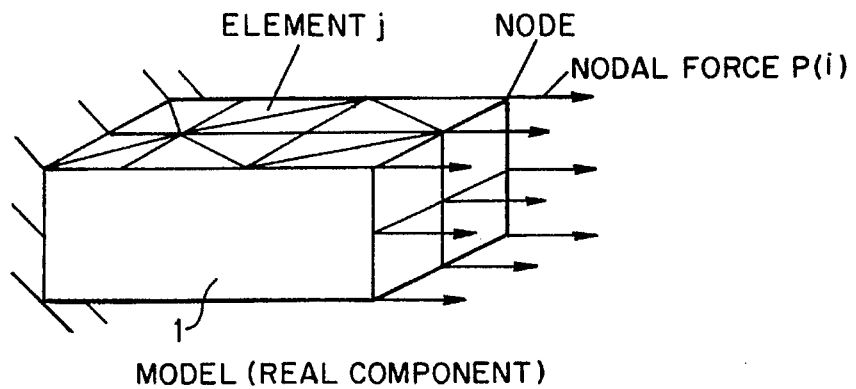
FIG. 1 is a pictorial view illustrating parameters used in the present invention.

Referring to FIG. 1, the model, indicated by numeral 1, has a surface for which the sum of principal stresses has been found and is divided into elements j (j=1 to n). Let Z(j) be the principal stress sum $(\sigma_1+\sigma_2+\sigma_3)$ at the positions of these surface elements (internal points). When the distribution of each sum Z(j) at the =1 to n). Let Z(j) be the principal stress sum $(\sigma_1+\sigma_2+\sigma_3)$ at the positions of these surface elements (internal points). When the distribution of each sum Z(j) at the surface of the actual object 1 is found in this way, we estimate the external force P(i) (i=1 to m) applied to the free node i on the surface of the actual object 1. At these free nodes i, displacement is not constrained. To prevent the solution being singular, only one arbitrary node may be constrained. The external force P(i) has a vertical component and a tangential component at each free nodal point i. In the following discussion, it is assumed that only one component exists for simplicity.

The sum of principal stresses $(\sigma_1+\sigma_2+\sigma_3)$ at the element j, when only an external force P(i)=1 is applied to the free nodal point i, is defined as F(i,j). As described above, the sum of principal stresses $(\sigma_1+\sigma_2+\sigma_3)$ is equal to $(\sigma_x+\sigma_y+\sigma_z)$. As mentioned previously, the sum F(i,j) is found by numerical analysis of stresses as the finite element method.

After finding the sum F(i,j), the external force P(i) which satisfies the following Eq. (1) is found.

$$
\begin{array}{llllll}
P(1)F(1,1) & +\ldots+ & P(i)F(i,1) & +\ldots+ & P(m)F(m,1) = & Z(1) \\
\vdots & & \vdots & & \vdots & \vdots \\
P(1)F(1,j) & +\ldots+ & P(i)F(i,j) & +\ldots+ & P(m)F(m,j) = & Z(j) \\
\vdots & & \vdots & & \vdots & \vdots \\
P(1)F(1,n) & +\ldots+ & P(i)F(i,n) & +\ldots+ & P(m)F(m,n) = & Z(n)
\end{array} \quad (1)
$$

That is, we attempt to find the distribution of external forces P(i) by the principle of superposition, so that the stress invariant of the first order by the external forces P(i) is equal to the principal stress sums Z(j) found in practice by utilizing the thermoelastic effect.

In practice, however, measurements and calculations may involve errors. Therefore, it is not highly meaningful that the external forces P(i) strictly satisfying Eq. (1) above are found. Accordingly, by taking account of errors, Eq. (1) is modified into the following Eq. (2).

$$
\begin{array}{llllll}
P(1)F(1,1) & +\ldots+ & P(i)F(i,1) & +\ldots+ & P(m)F(m,1) - & Z(1) = \epsilon(1) \\
\vdots & & \vdots & & \vdots & \vdots \\
P(1)F(1,j) & +\ldots+ & P(i)F(i,j) & +\ldots+ & P(m)F(m,j) - & Z(j) = \epsilon(j) \\
\vdots & & \vdots & & \vdots & \vdots \\
P(1)F(1,m) & +\ldots+ & P(i)F(i,m) & +\ldots+ & P(m)F(m,n) - & Z(n = \epsilon(n))
\end{array} \quad (2)
$$

By applying the least squares method, we estimate P(i) which minimizes $$E = \sum_{j=1}^{n} \{\epsilon(j)\}^2 \qquad (3)$$

That is, the external forces P(i) (i=1 to m) satisfying the following equation are found.

$$\frac{\delta E}{\delta P(i)} = 0 \qquad (4)$$

In Eq. (4), where i=1, we have $$2\epsilon(1)\delta\epsilon(1)/\delta P(1)+2\epsilon(2)\delta\epsilon(2)/\delta P(1)+\ldots+2\epsilon(n)\delta\epsilon(n)/\delta P(1)=0$$

From the above equation, we have $\epsilon(1)F(1,1) + \epsilon(2)F(1,2) + \ldots \epsilon(n)F(1,n) = 0$ $\{P(1)F(1,1) \quad +\ldots+ \quad P(i)F(i,1) \quad +\ldots+ \quad P(m)F(m,1) - Z(1)\}F(1,1) \quad +$ $\{P(1)F(1,2) \quad +\ldots+ \quad P(i)F(i,2) \quad +\ldots+ \quad P(m)F(m,2) - Z(2)\}F(1,2) \quad +$

.  .  .  .  +
.  .  .  .  +
.  .  .  .

$P(1)F(1,m) \quad +\ldots+ \quad P(i)F(i,m) \quad +\ldots+ \quad P(m)F(m,n) - Z(n=)\}F(1,n) \quad = 0$ Finally we have $$P(1) \sum_{j=1}^{n} \{F(1,j)\}^2 + P(2) \sum_{j=1}^{n} \{F(2,j)F(1,j)\} + \ldots P(m) \sum_{j=1}^{n} \{F(m,j)F(1,j)\} = \sum_{j=1}^{n} \{Z(j)F(1,j)\}$$

By putting them in order up to i=m in the same manner, the following simultaneous system of linear equations (5) can be derived:

$$\begin{bmatrix} \sum_{j=1}^{n} \{F(1,j)\}^2 & \sum_{j=1}^{n} \{F(2,j)F(1,j)\} & \ldots & \sum_{j=1}^{n} \{F(m,j)F(1,j)\} \\ \sum_{j=1}^{n} \{F(1,j)F(2,j)\} & \sum_{j=1}^{n} \{(2,j)\}^2 & \ldots & \sum_{j=1}^{n} \{F(m,j)F(2,j)\} \\ . & . & & . \\ . & . & & . \\ . & . & & . \\ \sum_{j=1}^{n} \{F(1,j)F(m,j)\} & \sum_{j=1}^{n} \{F(2,j)F(m,j)\} & \ldots & \sum_{j=1}^{n} \{F(m,j)\}^2 \end{bmatrix} \begin{bmatrix} P(1) \\ P(2) \\ . \\ . \\ . \\ P(m) \end{bmatrix} = \begin{bmatrix} \sum_{j=1}^{n} \{Z(j)F(1,j)\} \\ \sum_{j=1}^{n} \{Z(j)F(2,j)\} \\ . \\ . \\ . \\ \sum_{j=1}^{n} \{Z(j)F(m,j)\} \end{bmatrix}$$

This Esq. (5) can be solved by any known method, such as the LU (lower-upper) method or Gaussian method. Then, the distribution of external forces P(i) equal or approximate to the actually found principal stress sums Z(j) is determined.

Then, using this distribution of the external forces P(i) as the boundary conditions for the model 1, stresses are numerically analyzed by the finite element method or other method. In this way, the stress components $\sigma_x$, $\sigma_y$, $\sigma_z$, $\tau_{xy}$, $\tau_{yz}$ and $\tau_{zx}$ and the strains $\epsilon_x$, $\epsilon_y$, $\epsilon_z$, and so on at an arbitrary point in or on the model 1 can be found.

Figure 2:
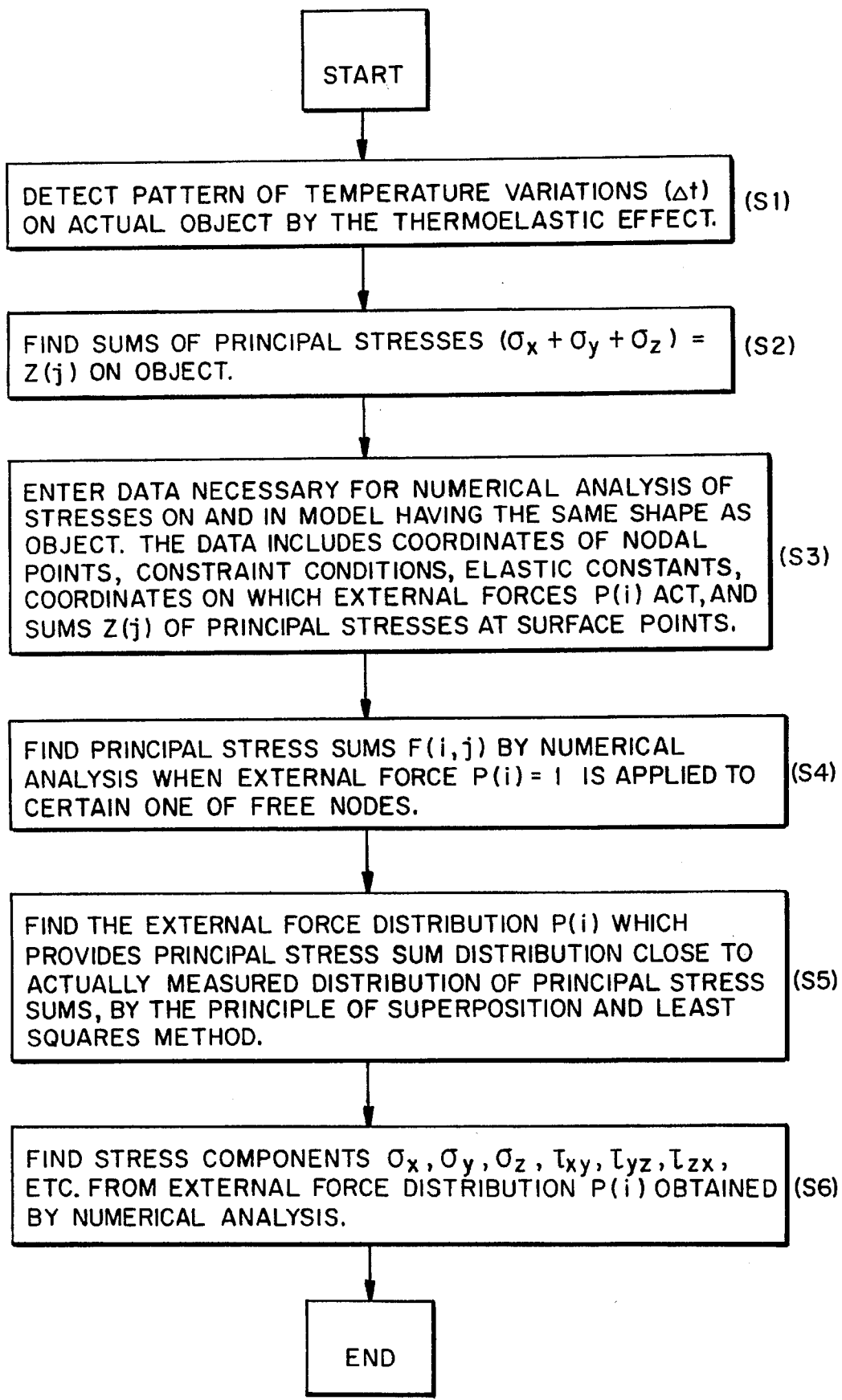
FIG. 2 is a flowchart illustrating the sequence of a method of finding a stress distribution in accordance with the invention.

The procedure of the method for finding the stress distribution as described above is illustrated in FIG. 2. In step 1, the pattern of the temperature variation ΔT on the surface of the actual object is detected, using the thermoelastic effect and utilizing a method as described, for example, in the above-cited Japanese Patent Publication Nos. 1204/1987, 1205/1987 and 7333/1988. Then, in step 2, the sum of the principal stresses $(\sigma_x+\sigma_y+\sigma_z=Z(j))$ on the surface of the actual object is found from the relation $\Delta T=-KT(\sigma_1+\sigma_2+\sigma_3)$. In step 3, the coordinates of the contact points, the constraint conditions, the elastic constants (such as Young's modulus and Poisson's ratios) that are necessary for numerical analysis of stresses in the model having the same shape as the actual model for which the principal stress sums have been found are entered. Also, the coordinates on which the external forces P(i) act are entered. Furthermore, the principal stress sums Z(j) at the internal surface points j found in step 2 are entered. In step 4, the principal stress sums F(i,j) when the external force P(i)=1 is applied to certain one of the free nodal points is found by numerical analysis of the stresses, for example, by utilizing the finite element method. At this time, in order that a balanced condition be maintained in the elastic body, one or two arbitrary nodes of the boundary are constrained. When the solutions are finally found, the correct value of the force acting on the nodal point of each constrained portion is found.

In step 5, the distribution of the external forces P(i) providing a principal stress sum distribution close to the actually measured principal stress sum distribution Z (j) is found, based on Eq. (5) from Z (j) and F(i,j), utilizing the principle of superposition and the least squares method. Thereafter, in step 6, the stress components $\sigma_x$, $\sigma_y$, $\sigma_z$, $\tau_{xy}$, $\tau_{yz}$ and $\tau_{zx}$, and so on are found from the external force distribution P(i) obtained in step 5.

Figure 3:
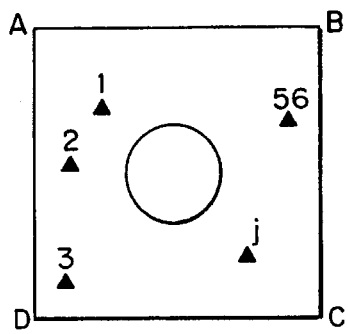
FIG. 3 is a view showing the shape of a rectangular plate used in an example of the invention, as well as internal points.

The principle of the novel method of finding the stress distribution from the temperature variation pattern on the surface of the elastic body has been described thus far. A specific example of the method applied to an actual two-dimensional object is described next. Referring to FIG. 3, a rectangular plate ABCD has a circular hole in its center. The principal stress sum $(\sigma_x+\sigma_y=Z(j))$ about 56 points inside the rectangular plate ABCD is found by the method making use of the thermoelastic effect. Data used for this method is listed in Table 1 below. It is to be noted that the Young's modulus is 21000.0 N/mm² and the Poisson's ratio is 0.3.

TABLE 1

| X | Y | $\sigma_x + \sigma_y$ | X | Y | $\sigma_x + \sigma_y$ |
|---|---|---|---|---|---|
| 60.0 | 0.0 | 0.0 | −100.0 | 10.0 | 0.1961 |
| 70.0 | 0.0 | 0.0 | −60.0 | 30.0 | 1.7778 |
| 80.0 | 0.0 | 0.0 | −80.0 | 30.0 | 0.9007 |
| 0.0 | 70.0 | 0.0 | −100.0 | 30.0 | 0.505 |
| 0.0 | 80.0 | 0.0 | −40.0 | 50.0 | 2.3795 |
| 0.0 | 90.0 | 0.0 | −60.0 | 50.0 | 1.6125 |
| 0.0 | 120.0 | 0.0 | −80.0 | 50.0 | 1.01 |
| 120.0 | 120.0 | −0.3472 | −100.0 | 50.0 | 0.64 |
| 120.0 | 100.0 | −0.4031 | −60.0 | −10.0 | −0.8766 |
| 120.0 | 0.0 | 0.0 | −80.0 | −10.0 | −0.3787 |
| 60.0 | 10.0 | −0.8766 | −100.0 | −10.0 | −0.1961 |
| 80.0 | 10.0 | −0.3787 | −60.0 | −30.0 | −1.7778 |
| 100.0 | 10.0 | −0.1961 | −80.0 | −30.0 | −0.9007 |
| 60.0 | 30.0 | −1.7778 | −100.0 | −30.0 | −0.505 |
| 80.0 | 30.0 | −0.9007 | −40.0 | −50.0 | −2.3795 |
| 100.0 | 30.0 | −0.505 | −60.0 | −50.0 | −1.6125 |
| 40.0 | 50.0 | −2.3795 | −80.0 | −50.0 | −1.01 |
| 60.0 | 50.0 | −1.6125 | −100.0 | −50.0 | −0.64 |
| 80.0 | 50.0 | −1.01 | 60.0 | −10.0 | 0.8766 |

TABLE 1-continued

| X | Y | $\sigma_x + \sigma_y$ | X | Y | $\sigma_x + \sigma_y$ |
|---|---|---|---|---|---|
| 100.0 | 50.0 | −0.64 | 80.0 | −10.0 | 0.3787 |
| −60.0 | 0.0 | 0.0 | 100.0 | −10.0 | 0.1961 |
| −70.0 | 0.0 | 0.0 | 60.0 | −30.0 | 1.7778 |
| −80.0 | 0.0 | 0.0 | 80.0 | −30.0 | 0.9007 |
| −120.0 | 120.0 | 0.3472 | 100.0 | −30.0 | 0.505 |
| −120.0 | 0.0 | 0.0 | 60.0 | −50.0 | 1.6125 |
| −60.0 | 10.0 | 0.8766 | 80.0 | −50.0 | 1.01 |
| −80.0 | 10.0 | 0.3787 | 100.0 | −50.0 | 0.64 |
| [N/mm²] | | | [N/mm²] | | |

Figure 4:
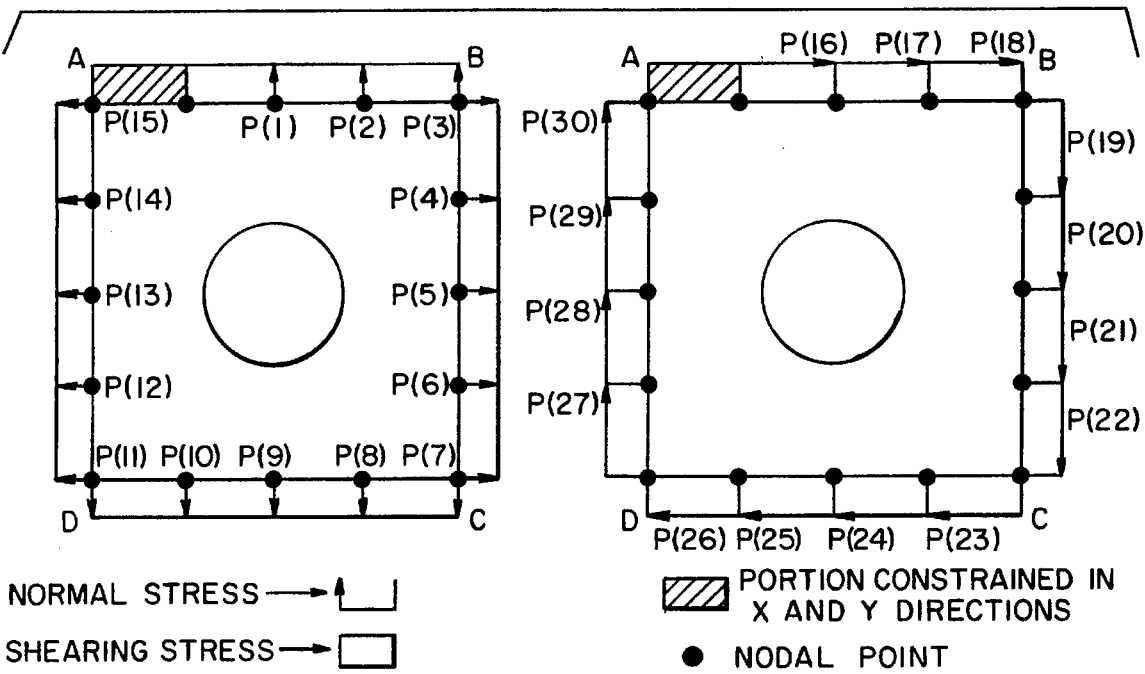
FIG. 4 is a view illustrating the manner in which external forces acting on the rectangular plate shown in FIG. 3 are determined.

In order to make a numerical analysis of the stresses in and on this rectangular plate ABCD, external forces P(1)–P(30) are determined as illustrated in FIG. 4.

Then, the sum of principal stresses $(\sigma_x+\sigma_y)$ at the internal point j when only external force P(i)=1 is applied to each free nodal point i is defined as F(i,j). The F(i,j) is found, for example, by the boundary element method. Data obtained up to this point is listed in Table 2 below.

TABLE 2

| internal point j | F(1,j) | F(2,j) | ... | ... | ... | F(30,J) | Z(j) |
|---|---|---|---|---|---|---|---|
| 1 | F(1,1) | F(2,1) | ... | ... | ... | F(30,1) | Z(1) |
| 2 | F(1,2) | F(2,2) | ... | ... | ... | F(30,2) | Z(2) |
| . | . | . | . | . | . | . | . |
| . | . | . | . | . | . | . | . |
| . | . | . | . | . | . | . | . |
| 56 | F(1,56) | F(2,56) | ... | ... | ... | F(30,56) | Z(56) |

As a result, Eq. (5) can be modified into the form of Eq. (6).

$$\begin{bmatrix} \sum_{j=1}^{56} \{F(1,j)\}^2 & \sum_{j=1}^{56} \{F(2,j)F(1,j)\} & \ldots & \sum_{j=1}^{56} \{F(30,j)F(1,j)\} \\ \sum_{j=1}^{56} \{F(1,j)F(2,j)\} & \sum_{j=1}^{56} \{(2,j)\}^2 & \ldots & \sum_{j=1}^{56} \{F(30,j)F(2,j)\} \\ . & . & & . \\ . & . & & . \\ . & . & & . \\ \sum_{j=1}^{56} \{F(1,j)F(30,j)\} & \sum_{j=1}^{56} \{F(2,j)F(30,j)\} & \ldots & \sum_{j=1}^{56} \{F(30,j)\}^2 \end{bmatrix} \begin{bmatrix} P(1) \\ P(2) \\ . \\ . \\ . \\ P(30) \end{bmatrix} = \begin{bmatrix} \sum_{j=1}^{56} \{Z(j)F(1,j)\} \\ \sum_{j=1}^{56} \{Z(j)F(2,j)\} \\ . \\ . \\ . \\ \sum_{j=1}^{56} \{Z(j)F(30,j)\} \end{bmatrix}$$

Solving the simultaneous equation, Eq. (6) results in P(1), P(2), ..., P(30). The normal, or vertical, force components (NF) and the tangential force components (SF) which are produced at the boundary and correspond to the contents of Table 1 are listed in Table 3 below.

TABLE 3

| No. | X | Y | NF | SF |
|---|---|---|---|---|
| 1(16) | 0.00 | 250.00 | −0.22 | 0.96 |
| 2(17) | 125.00 | 250.00 | −0.19 | 1.27 |
| 3(18) | 250.00 | 250.00 | −0.24 | −1.21 |
| 4(19) | 250.00 | 125.00 | −0.18 | −1.00 |
| 5(20) | 250.00 | 0.00 | 0.17 | −0.98 |
| 6(21) | 250.00 | −125.00 | 0.36 | −1.27 |
| 7(22) | 250.00 | −250.00 | 0.18 | 1.42 |
| 8(23) | 125.00 | −250.00 | 0.34 | 0.92 |
| 9(24) | 0.00 | −250.00 | −0.33 | 0.90 |
| 10(25) | −125.00 | −250.00 | −0.27 | 1.51 |
| 11(26) | −250.00 | −250.00 | −0.41 | −1.39 |
| 12(27) | −250.00 | −125.00 | −0.21 | −0.93 |
| 13(28) | −250.00 | 0.00 | 0.24 | −0.98 |

TABLE 3-continued

| No. | X | Y | NF | SF |
|---|---|---|---|---|
| 14(29) | −250.00 | 125.00 | 0.28 | −1.41 |
| 15(30) | −250.00 | 250.00 | 0.39 | 1.45 |

The stress components $\sigma_x$, $\sigma_y$, $\tau_{xy}$, strains $\epsilon_x$, $\epsilon_y$, etc. at an arbitrary point inside the rectangular plate ABCD can be found by numerical analysis of the stresses by the finite element method or other method, using the found external force distribution P(i) as the boundary conditions for the rectangular plate ABCD.

While the principle and the preferred examples of the novel method of finding the stress distribution from the temperature variation pattern on the surface of an elastic body have been described, the invention is not limited to these examples but rather various modifications are possible. The method of finding the principal stress sum distribution on the surface of the actual object by giving stress variations to the object and detecting the temperature variation pattern on the surface of the actual object by the thermoelastic effect can make use of an infrared camera as proposed by the present applicant. Furthermore, other well-known methods can be employed. In addition, the method of making a numerical analysis of the stress distribution in and on a model of a structure by giving boundary conditions to the model of the structure is not limited to the finite element method, boundary element method, or calculus of finite differences. Various other methods can also be exploited.

As can be understood from the description made thus far, in the novel method of finding the stress distribution from the temperature variation pattern on the surface of an elastic body, the distribution of external forces acting on free nodal points at the boundary which provide a principal stress sum distribution closest to the actually measured principal stress sum distribution obtained from the temperature variation pattern on the surface of the elastic body due to the thermoelastic effect is found. Then, the stress components acting on an arbitrary point on the actual object are found from the obtained external force distribution by numerical analysis. Consequently, the distribution of stresses on and in the actual object can be accurately found easily.

Having thus described my invention with the detail and particularity required by the Patent Laws, what is desired protected by Letters Patent is set forth in the following claims.

What is claimed is:

1. A method of finding a stress distribution from a temperature variation pattern on a surface of an elastic body, comprising the steps of:

adiabatically applying stress variations to the elastic body to be investigated;

detecting a temperature variation pattern on the surface of the elastic body created by a thermoelastic effect;

finding sums of principal stresses at points inside the surface of the object from said temperature variation pattern;

preparing a model of a structure having the same shape as said object;

finding distribution of principal stress sums on and in said model by numerical analysis;

finding such a distribution of external forces acting on free nodal points which provide a numerically analyzed principal stress sum distribution closest to an actually measured principal stress sum distribution; and finding stress components acting on arbitrary points on and in said object by numerical analysis from the found distribution of the external forces.

2. A method of finding a stress distribution from a temperature variation pattern on a surface of an elastic body as set forth in claim 1, wherein during execution of said step of finding distribution of principal stress sums on and in said model by numerical analysis, a plurality of free nodal points are established at a boundary of said model of the structure, and wherein sums of principal stresses produced at points inside the surface of said object when a unit external force is applied to certain one of the free nodal points are found.

3. A method of finding a stress distribution from a temperature variation pattern on a surface of an elastic body as set forth in claim 2, wherein when the unit external force is applied to certain one of the free nodal points, if sums of principal stresses produced at points inside the surface of said object are found by numerical analysis, an arbitrary portion of the boundary is constrained to maintain said object in a balanced condition.

4. A method of finding a stress distribution from a temperature variation pattern on a surface of an elastic body as set forth in claims 1 or 2, wherein the distribution of external forces acting on free nodal points which provide a numerically analyzed principal stress sum distribution closest to the actually measured principal stress sum distribution is found by the principle of superposition and the least squares method.

5. A method of finding a stress distribution from a temperature variation pattern on a surface of an elastic body as set forth in claim 1, where said numerical analysis for finding distribution of sums of principal stresses on and in said model of the structure is a finite element method.

6. A method of finding a stress distribution from a temperature variation pattern on a surface of an elastic body as set forth in claim 1, where said numerical analysis for finding distribution of sums of principal stresses on and in said model of the structure is a boundary element method.

7. A method of finding a stress distribution from a temperature variation pattern on a surface of an elastic body as set forth in claim 1, where said numerical analysis for finding distribution of sums of principal stresses on and in said model of the structure is a calculus of finite differences.

8. A method of finding a stress distribution from a temperature variation pattern on a surface of an elastic body, comprising the steps of:

adiabatically applying stress variations to the elastic body to be investigated;

detecting a temperature variation pattern on the surface of the elastic body created by a thermoelastic effect;

finding sums of principal stresses at points inside the surface of the object from said temperature variation pattern;

preparing a model of a structure having the same shape as said object;

establishing a plurality of free nodal points at a boundary of said model;

finding sums of principal stresses at points inside the surface of said object by numerical analysis when a unit external force is applied to certain one of the free nodal points;

finding distribution of external forces acting on the free nodal points which provide a principal stress sum distribution closest to an actually measured distribution of sums of principal stresses, by the principle of superposition and the least squares method; and finding stress components acting on arbitrary points on said object by numerical analysis from the found distribution of the external forces.

* * * * *

UNITED STATES PATENT AND TRADEMARK OFFICE
CERTIFICATE OF CORRECTION

PATENT NO. : 5,616,866
DATED : April 1, 1997
INVENTOR(S) : Yukitaka Murakami

It is certified that error appears in the above-indentified patent and that said Letters Patent is hereby corrected as shown below:

Column 1 Line 35 "other" should read --others--.

Column 1 Line 37 "thermoplastic" should read --thermoelastic--.

Column 2 Line 5 between "found." and "proportion" insert --The temperature variation pattern on the surface of the elastic body due to the thermoelastic effect is in--.

Column 3 Line 31 "11988" should read --1988--.

Column 3 Line 49 "numeral analysis" should read --numerical analysis--.

Column 4 Line 47 (Eq. 2) "Z(n=$\epsilon$(n))" should read --Z(n)=$\epsilon$(n)--.

Column 5 Line 32 "Esq. (5)" should read --Eq. (5)--.

Column 5 Line 49 "$\sigma_z+\sigma_y+\sigma_z$" should read --$\sigma_x+\sigma_y+\sigma_z$--.

Column 7 Line 25 Table 2 header, "F(30,J)" should read --F(30,j)--.

Column 7 Line 38 Eq. 6, second row, second column, before "(2,j)}$^2$" insert --F--.

UNITED STATES PATENT AND TRADEMARK OFFICE
CERTIFICATE OF CORRECTION

PATENT NO. : 5,616,866
DATED : April 1, 1997
INVENTOR(S) : Yukitaka Murakami

It is certified that error appears in the above-indentified patent and that said Letters Patent is hereby corrected as shown below:

Column 9 Claim 4 Line 37 "claims should read --claim--.

Signed and Sealed this

Fifth Day of August, 1997

Attest:

BRUCE LEHMAN

Attesting Officer

Commissioner of Patents and Trademarks